United States Patent
Qi et al.

(10) Patent No.: US 9,794,041 B2
(45) Date of Patent: Oct. 17, 2017

(54) METHOD FOR DETERMINING PILOT ARRANGEMENT AND BASE STATION

(71) Applicant: Huawei Technologies Co., Ltd., Shenzhen (CN)

(72) Inventors: Chenhao Qi, Nanjing (CN); Yiqun Wu, Shanghai (CN); Shunqing Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/178,405

(22) Filed: Jun. 9, 2016

(65) Prior Publication Data

US 2016/0294525 A1    Oct. 6, 2016

Related U.S. Application Data

(63) Continuation of application No. PCT/CN2014/087947, filed on Sep. 30, 2014.

(30) Foreign Application Priority Data

Dec. 12, 2013  (CN) .......................... 2013 1 0687413

(51) Int. Cl.
```
H04L 5/00       (2006.01)
H04B 7/0452     (2017.01)
H04W 88/08      (2009.01)
```
(52) U.S. Cl.
CPC ......... H04L 5/0048 (2013.01); H04B 7/0452 (2013.01); *H04L 5/0037* (2013.01); *H04W 88/08* (2013.01)

(58) Field of Classification Search
CPC ..... H04L 5/0048; H04B 7/0452; H04W 88/08
See application file for complete search history.

(56) References Cited

U.S. PATENT DOCUMENTS 8,149,934 B2 * 4/2012 Kwak ................... H04L 5/0048
                                                          375/260
2007/0183386 A1   8/2007 Muharemovic et al.
(Continued)

FOREIGN PATENT DOCUMENTS

CN    1917397 A    2/2007
CN    1951050 A    4/2007
(Continued)

OTHER PUBLICATIONS

Baraniuk, R.; "Compressive Sensing [Lecture Notes]," in IEEE Signal Processing Magazine, Jul. 2007, pp. 118-124.
(Continued)

*Primary Examiner* — Jean B Corrielus
(74) *Attorney, Agent, or Firm* — Slater Matsil, LLP (57) ABSTRACT

This application discloses a method for determining a pilot arrangement and a base station. The method includes the following steps. S1. Select a first optimized pilot arrangement P1 from an available subcarrier set G as a pilot arrangement of the first transmit antenna, and set G1=G−P1; S2. Perform a cyclic shift on the P1; if a Pi obtained after the shift is a subset of the G1, use the Pi as a pilot arrangement of the $i^{th}$ transmit antenna; or if a Pi obtained after the shift is not a subset of the G1, select a Pi from the G1 as a pilot arrangement of the $i^{th}$ transmit antenna; and set G1=G1−Pi and i=i+1, and repeatedly perform S2 until i is equal to a quantity of transmit antennas.

10 Claims, 5 Drawing Sheets

(56) References Cited

U.S. PATENT DOCUMENTS

| | | | |
|---|---|---|---|
| 2007/0195906 A1* | 8/2007 | Kim | H04B 7/0671 375/267 |
| 2010/0074358 A1 | 3/2010 | Khojastepour et al. | |
| 2010/0260235 A1 | 10/2010 | Yoshii et al. | |
| 2011/0286498 A1 | 11/2011 | Abrishamkar et al. | |
| 2012/0121048 A1 | 5/2012 | Gao et al. | |
| 2014/0198655 A1* | 7/2014 | Ishii | H04W 76/023 370/235 |
| 2015/0270996 A1 | 9/2015 | Ma et al. | |

FOREIGN PATENT DOCUMENTS

| | | |
|---|---|---|
| CN | 101374133 A | 2/2009 |
| CN | 101707582 A | 5/2010 |
| CN | 102932289 A | 2/2013 |
| CN | 103685088 A | 3/2016 |
| WO | 2009075104 A1 | 6/2009 |

OTHER PUBLICATIONS

Barhumi, I. et al.: "Optimal Training Design for MIMO OFDM Systems, in Mobile Wireless Channels," IEEE Transactions on Signal Processing, Jun. 2003, pp. 1615-1624, vol. 51, No. 6.

Berger, C. et al.: "Application of Compressive Sensing to Sparse Channel Estimation," in IEEE Communications Magazine, Nov. 2010, pp. 164-174, vol. 48, No. 11.

Dai, W. et al.: "Subspace Pursuit for Compressive Sensing Signal Reconstruction," IEEE Transactions on Information Theory, May 2009, pp. 2230-2249, vol. 55, No. 5.

Donoho, D.; "Compressed Sensing," IEEE Transactions on Information Theory, Apr. 2006, pp. 1289-1306, vol. 52, No. 4.

Efron, B. et al.: "Least Angle Regression," Annals of Statistics, Apr. 2004, pp. 407-499, vol. 32, No. 2.

Ghosh, A. et al.: "LTE-Advanced: Next-Generation Wireless Broadband Technology [Invited Paper]," in IEEE Wireless Communications, Jun. 24, 2010, pp. 10-22, vol. 17, No. 3.

Jin, J. et al.: "Compressive Sensing Based Overhead Reduction Scheme in Multi-Antenna Downlink Management," 2013 International Conference on Wireless Communications and Signal Processing, Oct. 24-26, 2013, pp. 1-5, Hangzhou.

Meng, J. et al.: "Compressive Sensing Based High-Resolution Channel Estimation for OFDM System," IEEE Journal of Selected Topics in Signal Processing, Feb. 2012, pp. 15-25, vol. 6, No. 1.

Needell, D. et al.: "COSAMP: Iterative Signal Recovery From Incomplete and Inaccurate Samples," Apr. 14, 2008, pp. 1-30.

Ozdemir, M.K. et al.: "Channel Estimation for Wireless OFDM Systems," in IEEE Communications Surveys & Tutorials, Jul. 2007, pp. 18-48, vol. 9, No. 2.

Qi, C. et al.: "A Hybrid Compressed Sensing Algorithm for Sparse Channel Estimation in MIMO OFDM Systems," 2011 IEEE International Conference on Acoustics, Speech and Signal Processing (ICASSP), May 22-27, 2011, pp. 3488-3491, Prague.

Qi, C. et al.: "A Study of Deterministic Pilot Allocation for Sparse Channel Estimation in OFDM Systems," in IEEE Communications Letter, May 2012, pp. 742-744, vol. 16, No. 5.

Qi, C. et al.: "Optimized Pilot Placement for Sparse Channel Estimation in OFDM Systems," IEEE Signal Processing Letters, Dec. 2011, pp. 749-752, vol. 18, No. 12.

Qi, C. et al.: "Tree-Based Backward Pilot Generation for Sparse Channel Estimation," Electronics Letters, Apr. 26, 2012, pp. 1-2, vol. 48, No. 9.

Tong, L. et al.: "Pilot-Assisted Wireless Transmissions: General Model, Design Criteria, and Signal Processing," in IEEE Signal Processing Magazine, Nov. 2004, pp. 12-25, vol. 21, No. 6.

Taubock, G. et al.: "Compressive Estimation of Doubly Selective Channels in Multicarrier Systems: Leakage Effects and Sparsity-Enhancing Processing," IEEE Journal of Selected Topics in Signal Processing, Apr. 2010, pp. 255-271, vol. 4, No. 2.

Tropp, J. et al.: "Signal Recovery From Random Measurements Via Orthogonal Matching Pursuit," IEEE Transactions on Information Theory, Dec. 2007, pp. 4655-4666, vol. 53, No. 12.

Wang, J. et al.: "Generalized Orthogonal Matching Pursuit," IEEE Transactions on Signal Processing, Dec. 2012, pp. 6202-6216, vol. 60, No. 12.

Zhang, P. et al.: "Deterministic Sequences for Compressive Mimo Channel Estimation," 21st European Signal Processing Conference (EUISPCO 2013), Sep. 9-13, 2013, pp. 1-5, Marrakech.

* cited by examiner

METHOD FOR DETERMINING PILOT ARRANGEMENT AND BASE STATION

CROSS-REFERENCE TO RELATED APPLICATIONS

This application is a continuation of International Application No. PCT/CN2014/087947, filed on Sep. 30, 2014, which claims priority to Chinese Patent Application No. 201310687413.7, filed on Dec. 12, 2013, both of which are hereby incorporated by reference in their entireties.

TECHNICAL FIELD

This application relates to the field of communications technologies, and in particular, to a method for determining a pilot arrangement and a base station.

BACKGROUND

Figure 1:
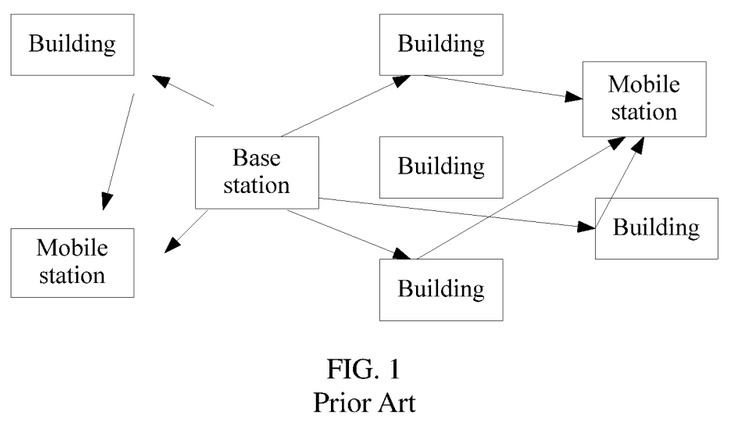
FIG. 1 is a schematic diagram of multipath transmission in an MIMO system in the prior art.

Considerable diversity gains and multiplexing gains can be obtained by using a Multi Input Multi Output (MIMO) technology, so that reliability and a transmission rate of a wireless communications system are improved. Currently, the technology has been widely applied to various wireless communications systems, such as a Long Term Evolution (LTE) system and a Worldwide Interoperability for Microwave Access (WiMax) system. However, with increase in a quantity of antennas at a transmit end and a receive end, a quantity of unknown channels also increases. For example, the 3rd Generation Partnership Project (3GPP) release 11 supports a downlink 8×8 MIMO architecture; before performing signal demodulation, the receive end needs to acquire channel state information (CSI) of 8×8=64 channels; if the transmit end further needs to perform MIMO beamforming, the receive end further needs to feed back the CSI to the transmit end. Therefore, accuracy of the CSI directly determines performance of an MIMO system. FIG. 1 is a schematic diagram of multipath transmission in an MIMO system.

To improve accuracy of CSI, a quantity of pilots is generally increased, which may reduce spectrum utilization and limit performance improvement of the MIMO system instead. For least square (LS) channel estimation, if a quantity of pilots needs to be greater than a maximum delay spread sampling value of a channel, relatively large pilot overheads are generally required. In view of this problem, sparse channel estimation is proposed, and a channel impulse response (CIR) is reconstructed by using an idea of sparsity recovery, which can fully exploit sparsity of a wireless channel and an advantage of a compressed sensing (CS) signal processing technology. Compared with the LS channel estimation, the sparse channel estimation can significantly reduce pilot overheads, and improve spectrum utilization.

To improve performance of the sparse channel estimation, an optimal pilot arrangement of a sparse channel needs to be determined. Currently, there are the following two common solutions for determining a pilot arrangement:

The prior art 1 is a pilot arrangement manner of equal space distribution, and this manner is generally used in an LTE system, where pilot arrangements are evenly distributed in a frequency domain and in a time domain. However, many research literatures indicate that a pilot arrangement determined for a sparse channel according to this manner is not optimized.

The prior art 2 is a random pilot arrangement manner. For example, for an MIMO system with two transmit antennas and 256 available orthogonal frequency division multiplexing (OFDM) subcarriers, if each transmit antenna uses 12 subcarriers as pilot subcarriers, 24 subcarriers are randomly selected from the 256 available OFDM subcarriers. Then 12 subcarriers are randomly selected from the selected 24 subcarriers and are allocated to a transmit antenna 1, and remaining 12 subcarriers are allocated to a transmit antenna 2. In this way, pilot subcarriers of different transmit antennas are orthogonal to each other, the two transmit antennas may send data simultaneously, and signals transmitted from the two different antennas can be effectively distinguished when sparse channel estimation is performed at a receive end. However, this manner still cannot ensure that a determined pilot arrangement is an optimized pilot arrangement.

SUMMARY

Embodiments of this application provide a method for determining a pilot arrangement and a base station, to resolve a problem that an optimized pilot arrangement cannot be determined for a sparse channel in an MIMO system by using an existing method for determining a pilot arrangement.

According to a first aspect, a method for determining a pilot arrangement is provided. The method includes the following steps. S1. Select a first optimized pilot arrangement P1 from an available subcarrier set G as a pilot arrangement of the first transmit antenna, and set G1=G−P1. S2. Perform a cyclic shift on the P1; if a Pi obtained after the shift is a subset of the G1, use the Pi as a pilot arrangement of the $i^{th}$ transmit antenna, where i is a natural number greater than or equal to 2; or if a Pi obtained after the shift is not a subset of the G1, select a Pi from the G1 as a pilot arrangement of the $i^{th}$ transmit antenna; and set G1=G1−Pi and i=i+1, and repeatedly perform S2 until i is equal to a quantity of transmit antennas.

With reference to the first aspect, in a first possible implementation manner, the selecting a first optimized pilot arrangement P1 from an available subcarrier set G specifically includes: after a quantity of pilots is determined, selecting subcarriers of the quantity of the pilots from the G each time in a permutation and combination manner or in a random manner as an initial pilot arrangement; substituting each selected initial pilot arrangement into a target function; and setting an initial pilot arrangement whose function value of the target function is the smallest as the P1.

With reference to the first aspect or the first possible implementation manner of the first aspect, in a second possible implementation manner, the performing a cyclic shift on the P1 specifically includes: performing the cyclic shift on the P1 by using the following formula:

$$Pi=(P1+i-1) \bmod N;$$

where

Pi is a pilot arrangement obtained after the cyclic shift is performed for the $i^{th}$ antenna, and N is a quantity of elements in an original subcarrier set.

With reference to the first aspect, the first possible implementation manner of the first aspect, or the second possible implementation manner of the first aspect, in a third possible implementation manner, pilot arrangements of any two transmit antennas are orthogonal in a frequency domain.

According to a second aspect, a base station is provided. The base station includes a processing unit, configured to:

select a first optimized pilot arrangement P1 from an available subcarrier set G as a pilot arrangement of the first transmit antenna, and set G1=G−P1; perform a cyclic shift on the P1; if a Pi obtained after the shift is a subset of the G1, use the P1 as a pilot arrangement of the $i^{th}$ transmit antenna, where i is a natural number greater than or equal to 2; or if a Pi obtained after the shift is not a subset of the G1, select a Pi from the G1 as a pilot arrangement of the $i^{th}$ transmit antenna; and set G1=G1−Pi and i=i+1, and repeatedly perform the cyclic shift on the P1 until i is equal to a quantity of transmit antennas. The base station also includes a transmit antenna, configured to transmit a pilot arrangement that is of each transmit antenna and that is obtained by the processing unit.

With reference to the second aspect, in a first possible implementation manner, the processing unit, which is configured to select the first optimized pilot arrangement P1 from the available subcarrier set G, is specifically configured to: after a quantity of pilots is determined, select subcarriers of the quantity of the pilots from the G each time in a permutation and combination manner or in a random manner as an initial pilot arrangement; substitute each selected initial pilot arrangement into a target function; and set an initial pilot arrangement whose function value of the target function is the smallest as the P1.

With reference to the second aspect or the first possible implementation manner of the second aspect, in a second possible implementation manner, the processing unit is configured to perform a cyclic shift on the P1 and is specifically configured to: perform the cyclic shift on the P1 by using the following formula:

$$Pi=(P1+i-1) \bmod N;$$

where

Pi is a pilot arrangement obtained after the cyclic shift is performed for the $i^{th}$ antenna, and N is a quantity of elements in an original subcarrier set.

With reference to the second aspect, the first possible implementation manner of the second aspect, or the second possible implementation manner of the second aspect, in a third possible implementation manner, pilot arrangements of any two transmit antennas are orthogonal in a frequency domain.

According to the method for determining a pilot arrangement provided in the first aspect, or the base station provided in the second aspect, this solution features strong commonality and flexibility, simplicity, quickness, and low complexity, and by using this solution, a pilot arrangement of a subsequent antenna may be obtained on the basis of a first optimized pilot arrangement, which ensures that a pilot arrangement determined for a sparse channel in an MIMO system is an optimized pilot arrangement.

DETAILED DESCRIPTION OF ILLUSTRATIVE EMBODIMENTS

Figure 2:
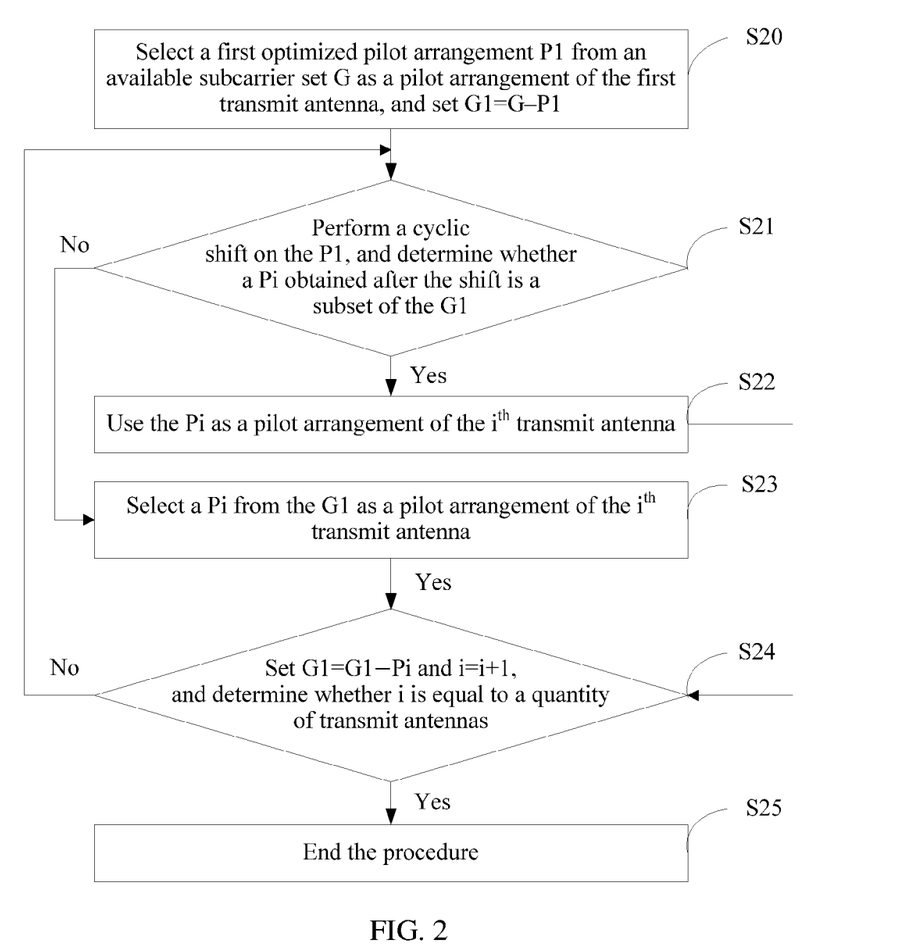
FIG. 2 is a flowchart of a method for determining a pilot arrangement according to an embodiment of this application.

In view of a problem that an optimized pilot arrangement cannot be determined for a sparse channel in an MIMO system by using an existing method for determining a pilot arrangement, an embodiment of this application provides a method for determining a pilot arrangement. A procedure of the method is shown in FIG. 2, and implementation steps are as follows.

S20: Select a first optimized pilot arrangement P1 from an available subcarrier set G as a pilot arrangement of the first transmit antenna, and set G1=G−P1.

As shown in FIG. 1, a base station has $N_t$ transmit antennas. In a coverage area of the base station, there are $N_u$ mobile stations, and each mobile station has one antenna. Therefore, an $N_t \times N_u$ multiuser MIMO system is constructed. There are multiple propagation paths from the base station to the mobile station. In addition to a direct path, there are also several reflection paths, and an effect of multipath propagation is noticeable. It is assumed that this system transmits signals by using OFDM, and the mobile station uses sparse channel estimation; a quantity of OFDM subcarriers is N, and the OFDM subcarriers form an original subcarrier set. A quantity of edge subcarriers and direct current subcarriers is $N_o$ in total, and $N-N_o$ available subcarriers form an available subcarrier set. A first optimized pilot arrangement $P_1 = \{k_1, k_2, \ldots, k_m\}$ is selected from the available subcarrier set, which indicates that the $k_{1th}$, $k_{2th}, \ldots, k_{mth}$ subcarriers are used to transmit a pilot symbol, where $1 \leq k_1 < k_2 < \ldots < k_m \leq N$.

After the P1 is selected, a difference set between the G and the P1 is obtained. The P1 is subtracted from the G to obtain the G1.

S21: Perform a cyclic shift on the P1, and determine whether a Pi obtained after the shift is a subset of the G1; if yes, perform S22; otherwise, perform S23.

S22: Use the Pi as a pilot arrangement of the $i^{th}$ transmit antenna, and perform S24.

S23: Select a Pi from the G1 as a pilot arrangement of the $i^{th}$ transmit antenna, and perform S24.

S24: Set G1=G1−Pi and i=i+1, where i is a natural number greater than or equal to 2, and determine whether i is equal to a quantity of transmit antennas; if yes, perform S25; otherwise, perform S21.

Each time the Pi is selected, the G1 needs to be updated, and G1=G1−Pi is performed.

S25: End the procedure.

This solution features strong commonality and flexibility, simplicity, quickness, and low complexity, and a pilot arrangement of a subsequent antenna may be obtained on the basis of a first optimized pilot arrangement, which ensures that a pilot arrangement determined for a sparse channel in an MIMO system is an optimized pilot arrangement.

Specifically, the foregoing S20 of selecting a first optimized pilot arrangement P1 from an available subcarrier set G specifically includes: after a quantity of pilots is determined, selecting subcarriers of the quantity of the pilots from the G each time in a permutation and combination manner or in a random manner as an initial pilot arrangement; substituting each selected initial pilot arrangement into a target function; and setting an initial pilot arrangement whose function value of the target function is the smallest as the P1.

If the quantity of pilots is M, pilot symbols sent by a transmit antenna are $X(k_1), X(k_2), \ldots, X(k_M)$, and received pilot symbols are denoted as $Y(k_1), Y(k_2), \ldots, Y(k_M)$, a issue of OFDM channel estimation may be represented as:

$$\begin{bmatrix} Y(k_1) \\ Y(k_2) \\ \vdots \\ Y(k_M) \end{bmatrix} = \begin{bmatrix} X(k_1) & 0 & 0 & 0 \\ 0 & X(k_2) & 0 & 0 \\ 0 & 0 & \ddots & 0 \\ 0 & 0 & 0 & X(k_M) \end{bmatrix} \cdot F_{M \times L} \cdot \begin{bmatrix} h(1) \\ h(2) \\ \vdots \\ h(L) \end{bmatrix} + \begin{bmatrix} \eta(1) \\ \eta(2) \\ \vdots \\ \eta(M) \end{bmatrix}, \quad (1)$$

where $h=[h(1), h(2), \ldots, h(L)]^T$ is an equivalent discrete channel impulse response function, and a length is L. A superscript "T" represents vector transposition. $\eta=[\eta(1), \eta(2), \ldots, \eta(M)]^T$ is a noise vector, where each element is independent and identically distributed and meets complex Gaussian distribution with a mean of 0 and a variance of $ó^2$. For a standard N-dimensional DFT square matrix F, M lines that are of the F and whose line numbers are respectively $k_1$, $k_2, \ldots, k_m$ and first L columns of the F are selected to form an M×L-dimensional DFT submatrix $F_{M \times L}$. Set $y=[Y(k_1), Y(k_2), \ldots, Y(k_M)]^T$. $X=\mathrm{diag}\{X(k_1), X(k_2), \ldots, X(k_M)\}$ is a diagonal matrix including transmitted pilot symbols $X(k_1), X(k_2), \ldots, X(k_M)$. A product of the square matrix X and $F_{M \times L}$ is set to $A=X \cdot F_{M \times L}$ (A is also referred to as an observation matrix); therefore, the formula (1) may be further written as:

$$y = A \cdot h + \eta,$$

where $h=[h(1), h(2), \ldots, h(L)]^T$ is sparse, that is, most of the L elements are zero, and only a few are not zero. Therefore, a issue of channel estimation is essentially estimating h by using a known y and A when a noise term ç is unknown, and fully using prior information that h is sparse. If a pilot arrangement is p, and once the p is determined, $F_{M \times L}$ is determined, and a corresponding A is determined.

Cross-correlation of the matrix A is defined as:

$$g(p) = \max_{0 \leq m < n < L-1} |\langle A(m), A(n) \rangle|$$

$$= \max_{0 \leq m < n < L-1} \left| \sum_{i=1}^{M} |X(k_i)|^2 e^{-j\frac{2\pi}{N} k_i (n-m)} \right|;$$

where

A(m) represents the $m^{th}$ line of the matrix A, and <a, b> represents an inner product of a vector a and a vector b. Generally, powers of all pilot symbols are the same, that is:

$$|X(k_1)|^2 = |X(k_2)|^2 = \ldots = |X(k_M)|^2 = W;$$

and a target function is:

$$g(p) = W \cdot \max_{0 \leq m < n < L-1} \left| \sum_{i=1}^{M} e^{-j\frac{2\pi}{N} k_i (n-m)} \right|.$$

An optimal pilot arrangement, that is, a pilot arrangement for minimizing the cross-correlation of the matrix A is:

$$p_{opt} = \arg \min_p g(p).$$

It is not difficult to find that, if the p offsets a location of a constant c, a function value of the target function of the p does not change, that is:

$$g(p+c) = W \cdot \max_{0 \leq m < n < L-1} \left| \sum_{i=1}^{M} e^{-j\frac{2\pi}{N}(k_i+c)(n-m)} \right|$$

$$= W \cdot \max_{0 \leq m < n < L-1} \left| e^{-j\frac{2\pi}{N} c(n-m)} \cdot \sum_{i=1}^{M} e^{-j\frac{2\pi}{N} k_i (n-m)} \right|$$

$$= g(p).$$

Therefore, if the p is an optimized pilot arrangement under this parameter condition, p+c obtained after a cyclic shift is performed on the p is also an optimized pilot arrangement, and function values that are of the target function and that correspond to the two are the same, that is, g(p)=g(p+c).

Specifically, the foregoing S21 of performing a cyclic shift on the P1 specifically includes:

performing the cyclic shift on the P1 by using the following formula:

$$Pi = (P1 + i - 1) \bmod N;$$

where

Pi is a pilot arrangement obtained after the cyclic shift is performed for the $i^{th}$ antenna, and N is a quantity of elements in an original subcarrier set.

This operation may be quickly implemented by using a cyclic shift register. The method in this application makes pilots of all transmit antennas of a base station orthogonal in a frequency domain, and when any mobile station receives signals simultaneously sent by different antennas of the base station, the mobile station can distinguish the signals effectively.

Figure 3:
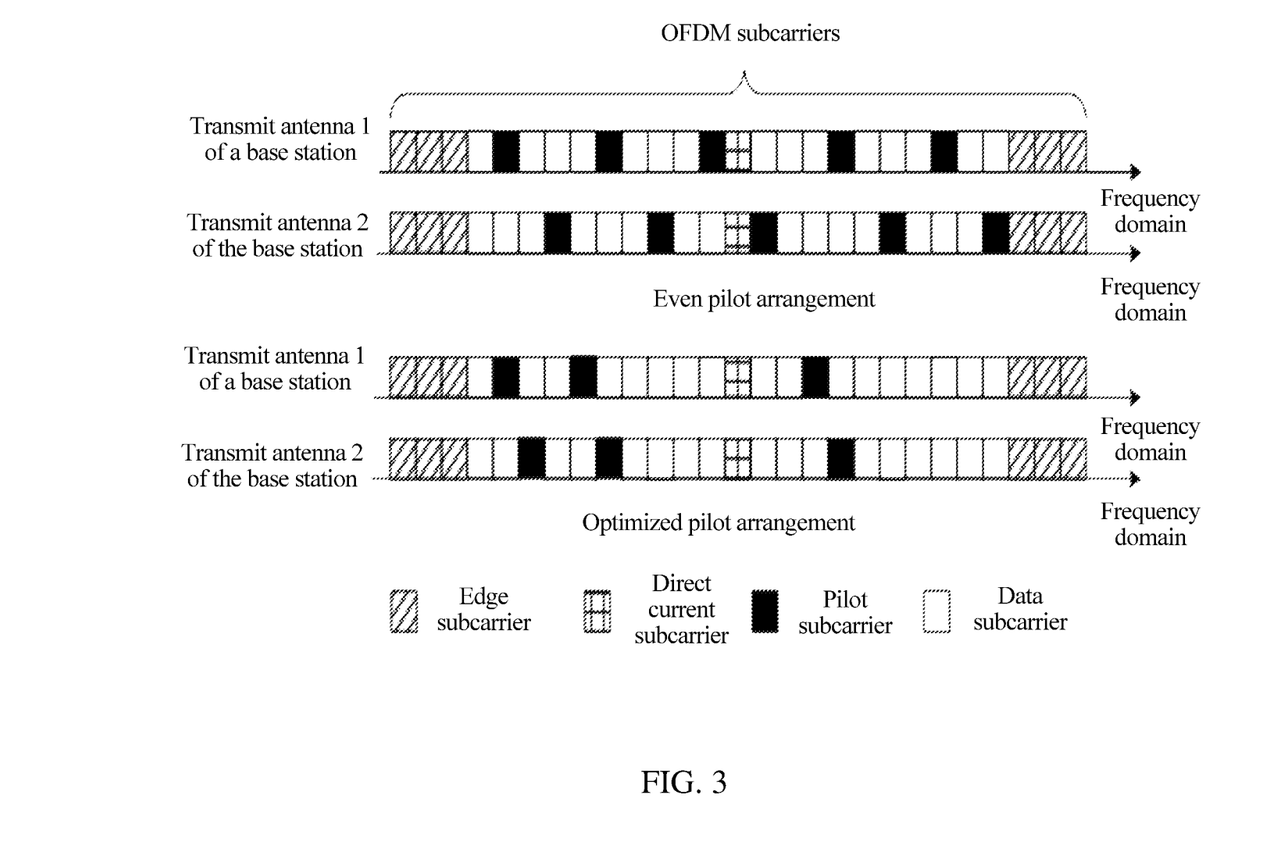
FIG. 3 is a schematic diagram of comparison between pilot arrangements determined for a sparse channel in an MIMO system according to the prior art 2 and an embodiment of this application.

FIG. 3 provides a schematic diagram of comparison between pilot arrangements determined for a sparse channel in an MIMO system according to the prior art 2 and an embodiment of this application. Except edge subcarrier at two sides and a direct current subcarrier, an optimal pilot arrangement applicable to a sparse channel is determined from remaining available OFDM subcarriers. A top part of FIG. 3 is an even pilot arrangement obtained according to the prior art 2, that is, an equal-space pilot arrangement is used, pilots of different transmit antennas are orthogonal to each other in a frequency domain. A bottom part of FIG. 3 is a pilot arrangement determined according to an embodiment of this application, spaces are not necessarily equal, and a pilot arrangement of a transmit antenna 2 of a base station may be obtained by performing a cyclic shift on a pilot arrangement of a transmit antenna 1 of the base station.

The following uses a specific instance to describe a method for determining a pilot arrangement in this application. It is assumed that a base station has four transmit antennas; in a coverage area of the base station, there are two mobile stations; and each mobile station has one antenna; therefore, a 4×2 multiuser MIMO system is constructed. A quantity of OFDM subcarriers is 1024, a quantity of edge subcarriers at two sides and direct current subcarriers is 421 in total, and a quantity of pilots is 24; a length of a cyclic prefix of OFDM is 64, and a length of a channel impulse response after sampling is 60. Except the OFDM direct current subcarriers and edge subcarriers, 603 available subcarriers form an available subcarrier set G={209, 210, . . . , 510, 511, 513, 514, . . . 811, 812}. It is assumed that an acquired first optimized pilot arrangement is $p_1$={209, 223, 226, 234, 250, 310, 348, 382, 396, 420, 456, 469, 542, 581, 590, 638, 656, 710, 740, 766, 798, 802, 804, 811}, the $p_1$ is used as a pilot arrangement of the first transmit antenna of the base station, and a pilot arrangement $p_2$ of the second transmit antenna may be obtained by performing a cyclic shift on the $p_1$, where $p_i'=(p_1+i-1) \mod 1024=(k_M+i-1) \mod 1024$. When i=1, $p_1'$ is still the $p_1$; when i=2, $p_2'$={224, 227, 235, 251, 311, 349, 383, 397, 421, 457, 470, 543, 582, 591, 639, 657, 711, 741, 767, 799, 803, 805, 812} may be obtained by means of calculation, and is used as an optimal pilot arrangement of the second transmit antenna and is denoted as $p_2$. However, it may be also found that, the last three pilot subcarriers of the $p_1$ are close to the last three pilot subcarriers of the $p_2$, shift continues to be performed on the $p_1$, and an obtained pilot arrangement is {211, 225, 228, 236, 252, 312, 350, 384, 398, 422, 458, 471, 544, 583, 592, 640, 658, 712, 742, 768, 800, 804, 806, 813}, where 804 has been used in the $p_1$, and 813 is not a subcarrier in the available subcarrier set; therefore, pilot arrangements of the third and the fourth transmit antennas of the base station cannot be obtained by means of cyclic shift. Therefore, $p_3$={211, 212, 213, 238, 280, 336, 345, 363, 375, 390, 491, 501, 561, 568, 589, 611, 666, 716, 752, 756, 797, 801, 809, 810} is reselected and allocated to the third transmit antenna of the base station, and $p_4$={214, 215, 216, 217, 252, 267, 274, 303, 392, 403, 466, 478, 489, 508, 580, 628, 641, 676, 690, 706, 781, 792, 807, 808} is allocated to the fourth transmit antenna of the base station. When either of the mobile stations (a mobile station 1 or a mobile station 2) simultaneously receives signals sent by the transmit antenna 1, the transmit antenna 2, the transmit antenna 3, and the transmit antenna 4 of the base station, because the four transmit antennas respectively use the pilot arrangement $p_1$, $p_2$, $p_3$, and $p_4$ that are orthogonal in a frequency domain, the $p_1$ may be used for estimating a parameter of a channel from the transmit antenna 1 to the mobile station, the $p_2$ may be used for estimating a parameter of a channel from the transmit antenna 2 to the mobile station, the $p_3$ may be used for estimating a parameter of a channel from the transmit antenna 3 to the mobile station, the $p_4$ may be used for estimating a parameter of a channel from the transmit antenna 4 to the mobile station.

The method for determining a pilot arrangement for a sparse channel in an MIMO system in this embodiment of this application can improve mean square error (MSE) performance of sparse channel estimation of the MIMO system.

A mean square error is defined as:

$$MSE = \frac{\|\hat{h} - h\|_2^2}{\|h\|_2^2};$$

where $\hat{h}$ is a channel estimation result of h, and $\|\cdot\|_2$ represents a $l_2$ norm of a vector.

The following compares a method for determining a pilot arrangement in an embodiment of this application and two manners in the background.

Continuing with the foregoing example, the $p_1$, $p_2$, $p_3$, and $p_4$ are separately substituted into a target function, and $g(P_1)=g(P_2)=8.0233$, $g(P_3)=8.0291$, and $g(P_4)=8.0667$ are obtained.

By using a solution of the prior art 1, an obtained pilot arrangement of a transmit antenna 1 of a base station is $Q_1$={210, 236, 262, 288, 314, 340, 366, 392, 418, 444, 470, 496, 522, 548, 574, 600, 626, 652, 678, 704, 730, 756, 782, 808}, an obtained pilot arrangement of a transmit antenna 2 is $Q_2$={211, 237, 263, 289, 315, 341, 367, 393, 419, 445, 471, 497, 523, 549, 575, 601, 627, 653, 679, 705, 731, 757, 783, 809}, an obtained pilot arrangement of a transmit antenna 3 is $Q_3$={212, 238, 264, 290, 316, 342, 368, 394, 420, 446, 472, 498, 524, 550, 576, 602, 628, 654, 680, 706, 732, 758, 784, 810}, and an obtained pilot arrangement of a transmit antenna 4 is $Q_4$={213, 239, 265, 291, 317, 343, 369, 395, 421, 447, 473, 499, 525, 551, 577, 603, 629, 655, 681, 707, 733, 759, 785, 811}; the $Q_1$, $Q_2$, $Q_3$, and $Q_4$ are separately substituted into a target function, and $g(Q_1)=g(Q_2)=g(Q_3)=g(Q_4)=21.8929$ is obtained.

By using a solution of the prior art 2, 96 subcarriers are randomly selected from 603 available subcarriers, and four groups of 24 subcarriers are randomly selected from the 96 subcarriers in sequence and respectively used as pilot arrangements $R_1$, $R_2$, $R_3$, and $R_4$ of the transmit antenna 1, the transmit antenna 2, the transmit antenna 3, and the transmit antenna 4, which ensures that no overlap exists between the four groups of pilot arrangements; and then the $R_1$, $R_2$, $R_3$, and $R_4$ are separately substituted into a target function, and $g(R_1)$, $g(R_2)$, $g(R_3)$, and $g(R_4)$, are obtained. The foregoing pilot design steps are repeated 1000 times, and target functions obtained after results of the 1000 times are averaged are $\tilde{g}(R_1)=13.1062$, $\tilde{g}(R_2)=13.0981$, $\tilde{g}(R_3)=13.1089$, and $\tilde{g}(R_4)=13.1113$ respectively.

Figure 4:
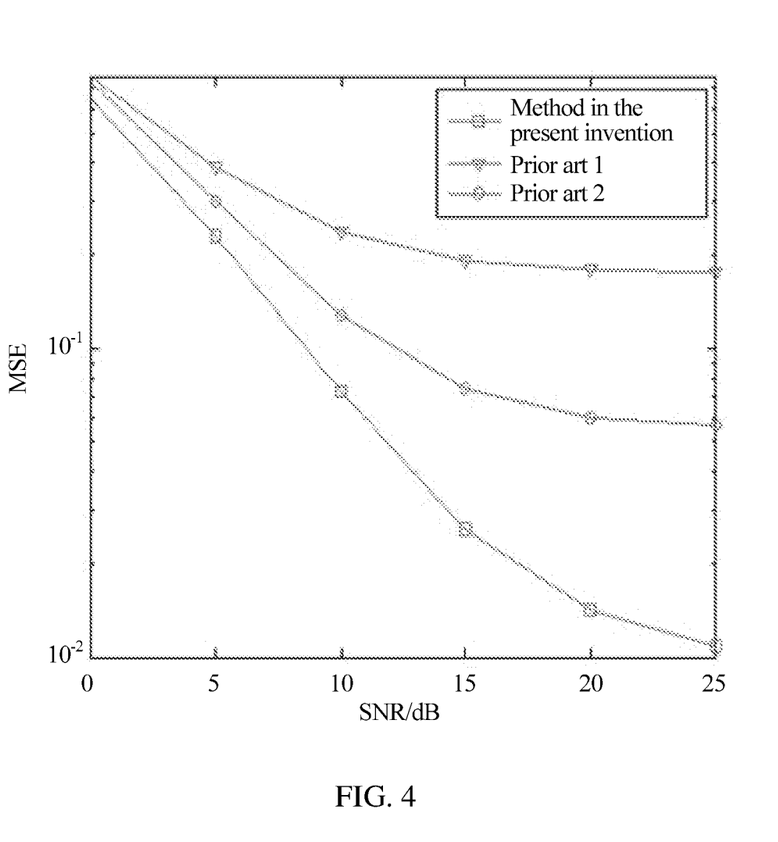
FIG. 4 is a schematic diagram of comparison between a method for determining a pilot arrangement according to an embodiment of this application and two solutions in the prior art 1 and the prior art 2.

It is assumed that a channel is sparse, that is, most of L taps of the channel are zero, and only a few taps are not zero. A quantity of multipaths of the channel is 5. A manner of generating a channel each time is randomly selecting 5 taps from L=60 taps as non-zero taps, where tap coefficients at positions of the 5 taps follow complex Gaussian distribution with a mean of 0 and variance of 1. Sparse channel estimation is performed on each randomly generated channel by using a mainstream OMP algorithm. A channel is randomly generated 10000 times, and finally results of the 10000 times are averaged. During channel estimation, it is assumed that a quantity of non-zero taps of the channel is unknown, positions of the non-zero taps are unknown, and coefficient values of the non-zero taps are unknown. For the second solution in the background, MSE performance of pilot arrangements randomly generated in 1000 times needs to be averaged finally. As shown in FIG. 4, under a condition of a same channel parameter, the method in this application, a solution of the prior art 1, and a solution of the prior art 2 are compared. A mobile station separately uses pilots from the transmit antenna 1, the transmit antenna 2, the transmit antenna 3, and the transmit antenna 4 to perform independent sparse channel estimation for four links, and perform averaging on MSEs of the four channels. It can be learnt that, the method (using $P_1$, $P_2$, $P_3$, and $P_4$) in this embodiment of this application is superior to the prior art 2 (using $R_1$, $R_2$, $R_3$, and $R_4$), and is far superior to the prior art 1 (using $Q_1$, $Q_2$, $Q_3$, and $Q_4$), thereby greatly improving performance of sparse channel estimation of an MIMO system.

Figure 5:
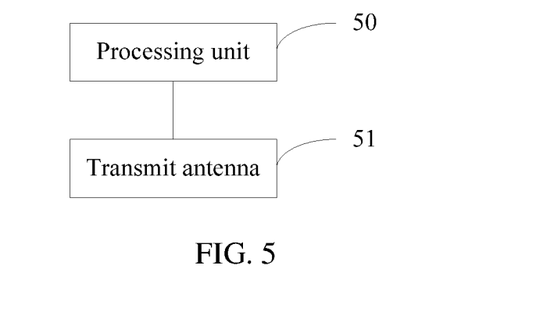
FIG. 5 is a schematic structural diagram of a first base station according to an embodiment of this application.

Based on a same invention conception, an embodiment of this application provides a base station, and a structure of the base station is shown in FIG. 5. The base station includes a processing unit 50, configured to: select a first optimized pilot arrangement P1 from an available subcarrier set G as a pilot arrangement of the first transmit antenna, and set G1=G−P1; perform a cyclic shift on the P1; if a Pi obtained after the shift is a subset of the G1, use the Pi as a pilot arrangement of the $i^{th}$ transmit antenna, where i is a natural number greater than or equal to 2; or if a Pi obtained after the shift is not a subset of the G1, select a Pi from the G1 as a pilot arrangement of the $i^{th}$ transmit antenna; and set G1=G1−Pi and i=i+1, and repeatedly perform the cyclic shift on the P1 until i is equal to a quantity of transmit antennas. The base station also includes a transmit antenna 51, configured to transmit a pilot arrangement that is of each transmit antenna and that is obtained by the processing unit.

Specifically, the foregoing processing unit 50, which is configured to select the first optimized pilot arrangement P1 from the available subcarrier set G, is specifically configured to: after a quantity of pilots is determined, select subcarriers of the quantity of the pilots from the G each time in a permutation and combination manner or in a random manner as an initial pilot arrangement; substitute each selected initial pilot arrangement into a target function; and set an initial pilot arrangement whose function value of the target function is the smallest as the P1.

Specifically, the foregoing processing unit 50, which is configured to perform the cyclic shift on the P1, is specifically configured to perform the cyclic shift on the P1 by using the following formula:

$$Pi=(P1+i-1) \bmod N;$$

where

Pi is a pilot arrangement obtained after the cyclic shift is performed for the $i^{th}$ antenna, and N is a quantity of elements in an original subcarrier set.

Specifically, pilot arrangements of any two transmit antennas are orthogonal in a frequency domain.

Figure 6:
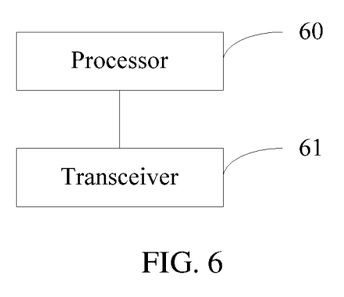
FIG. 6 is a schematic structural diagram of a second base station according to an embodiment of this application.

Based on a same invention conception, an embodiment of this application provides a base station, and a structure of the base station is shown in FIG. 6. The base station includes a processor 60, configured to: select a first optimized pilot arrangement P1 from an available subcarrier set G as a pilot arrangement of the first transmit antenna, and set G1=G−P1; perform a cyclic shift on the P1; if a Pi obtained after the shift is a subset of the G1, use the Pi as a pilot arrangement of the $i^{th}$ transmit antenna, where i is a natural number greater than or equal to 2; or if a Pi obtained after the shift is not a subset of the G1, select a Pi from the G1 as a pilot arrangement of the $i^{th}$ transmit antenna; and set G1=G1−Pi and i=i+1, and repeatedly perform the cyclic shift on the P1 until i is equal to a quantity of transmit antennas. The base station also includes a transceiver 61, configured to transmit a pilot arrangement that is of each transmit antenna and that is obtained by the processor 60.

The foregoing processor 60 is connected to the transceiver 61 by using a bus.

Specifically, the foregoing processor 60, which is configured to select the first optimized pilot arrangement P1 from the available subcarrier set G, is specifically configured to: after a quantity of pilots is determined, select subcarriers of the quantity of the pilots from the G each time in a permutation and combination manner or in a random manner as an initial pilot arrangement; substitute each selected initial pilot arrangement into a target function; and set an initial pilot arrangement whose function value of the target function is the smallest as the P1.

Specifically, the foregoing processor 60, which is configured to perform the cyclic shift on the P1, is specifically configured to perform the cyclic shift on the P1 by using the following formula:

$$Pi=(P1+i-1) \bmod N;$$

where

Pi is a pilot arrangement obtained after the cyclic shift is performed for the $i^{th}$ antenna, and N is a quantity of elements in an original subcarrier set.

Specifically, pilot arrangements of any two transmit antennas are orthogonal in a frequency domain.

Obviously, persons skilled in the art can make various modifications and variations to this application without departing from the spirit and scope of this application. This application is intended to cover these modifications and variations of this application provided that they fall within the scope of protection defined by the following claims and their equivalent technologies. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   selecting a first optimized pilot arrangement P1 from an available subcarrier set G as a pilot arrangement of a first transmit antenna of a plurality of transmit antennas, and setting a difference set G1 according to the relation G1=G−P1;
   performing a cyclic shift on the P1 to obtain a Pi, wherein i is a sequence number corresponding to a transmit antenna of the plurality of transmit antennas, and i is a natural number in a range of 2 to T, wherein T is a quantity of transmit antennas in the plurality of transmit antennas;
   selecting a pilot arrangement of an $i^{th}$ transmit antenna of the plurality of transmit antennas, the selecting comprising:
   in response to a Pi obtained after the shift being a subset of the G1, use the Pi as a pilot arrangement of the $i^{th}$ transmit antenna; and
   in response to a Pi obtained after the shift not being a subset of the G1, select a Pi from the G1 as a pilot arrangement of the $i^{th}$ transmit antenna; and
   setting G1 according to the relation G1=G1−Pi and incrementing i according to the relation i=i+1, and repeatedly performing cyclic shifts on the Pi to obtain a new Pi, selecting the pilot arrangements of the $i^{th}$ transmit antenna, and incrementing i according to the relation i=i+1 until i is equal to the quantity of transmit antennas in the plurality of transmit antennas.

2. The method according to claim 1, wherein selecting the first optimized pilot arrangement P1 from an available subcarrier set G further comprises:
   after a quantity of pilots is determined, selecting subcarriers of the quantity of the pilots from the available subcarrier set G each time in a random manner as an initial pilot arrangement;
   substituting each selected initial pilot arrangement into a target function; and setting an initial pilot arrangement whose function value of the target function is the smallest as the P1.

3. The method according to claim 1, wherein selecting the first optimized pilot arrangement P1 from an available subcarrier set G further comprises:
after a quantity of pilots is determined, selecting subcarriers of the quantity of the pilots from the available subcarrier set G each time in a permutation and combination manner;
substituting each selected initial pilot arrangement into a target function; and
setting an initial pilot arrangement whose function value of the target function is the smallest as the P1.

4. The method according to claim 1, wherein performing the cyclic shift on the P1 further comprises:
performing the cyclic shift on the P1 according to the following relation:

$$Pi=(P1+i-1) \bmod N;$$

wherein Pi is a pilot arrangement obtained after the cyclic shift is performed for the $i^{th}$ transmit antenna, and N is a quantity of elements in an original subcarrier set, and wherein N is greater than 0.

5. The method according to claim 1, wherein pilot arrangements of any two transmit antennas of the plurality of transmit antennas are orthogonal in a frequency domain.

6. A base station, comprising:
a processor, configured to:
select a first optimized pilot arrangement P1 from an available subcarrier set G as a pilot arrangement of a first transmit antenna of a plurality of transmit antennas, and set a difference set G1 according to the relation G1=G−P1;
perform a cyclic shift on the P1 to obtain a Pi, wherein i is a sequence number corresponding to a transmit antenna of the plurality of transmit antennas, and i is a natural number in a range of 2 to T, wherein T is a quantity of transmit antennas in the plurality of transmit antennas;
select a pilot arrangement of an $i^{th}$ transmit antenna of the plurality of transmit antennas, the selecting comprising:
in response to a Pi obtained after the shift being a subset of the G1, using the Pi as a pilot arrangement of the $i^{th}$ transmit antenna; and
in response to a Pi obtained after the shift not being a subset of the G1, selecting a Pi from the G1 as a pilot arrangement of the $i^{th}$ transmit antenna; and set G1 according to the relation G1=G1−Pi and increment i according to the relation i=i+1, and repeatedly perform cyclic shifts on the Pi to obtain a new Pi, select pilot arrangements of the $i^{th}$ transmit antenna of the plurality of transmit antennas, and increment i according to the relation i=i+1 until i is equal to the quantity of transmit antennas of the plurality of transmit antennas; and
the plurality of transmit antennas, configured to transmit a pilot arrangement on each transmit antenna of the plurality of transmit antennas, wherein the pilot arrangement is obtained by the processor.

7. The base station according to claim 6, wherein selecting the first optimized pilot arrangement P1 from an available subcarrier set G comprises:
after a quantity of pilots is determined, select subcarriers of the quantity of the pilots from the available subcarrier set G each time in a permutation and combination manner;
substitute each selected initial pilot arrangement into a target function; and
set an initial pilot arrangement whose function value of the target function is the smallest as the P1.

8. The base station according to claim 6, wherein selecting the first optimized pilot arrangement P1 from an available subcarrier set G comprises:
after a quantity of pilots is determined, select subcarriers of the quantity of the pilots from the available subcarrier set G each time in a random manner as an initial pilot arrangement;
substitute each selected initial pilot arrangement into a target function; and
set an initial pilot arrangement whose function value of the target function is the smallest as the P1.

9. The base station according to claim 6, wherein performing the cyclic shift on the P1 further comprises:
perform the cyclic shift on the P1 according to the following relation:

$$Pi=(P1+i-1) \bmod N;$$

wherein Pi is a pilot arrangement obtained after the cyclic shift is performed for the $i^{th}$ transmit antenna, and N is a quantity of elements in an original subcarrier set, and wherein N is greater than zero.

10. The base station according to claim 6, wherein pilot arrangements of any two transmit antennas of the plurality of transmit antennas are orthogonal in a frequency domain.

* * * * *